(No Model.)

L. HEYNEMANN.
CABLE STREET RAILWAY.

No. 444,437. Patented Jan. 13, 1891.

Witnesses:
Tims. Lynch
John C. White

Inventor:
Lionel Heynemann

UNITED STATES PATENT OFFICE.

LIONEL HEYNEMANN, OF SAN FRANCISCO, CALIFORNIA.

CABLE STREET-RAILWAY.

SPECIFICATION forming part of Letters Patent No. 444,437, dated January 13, 1891.

Application filed April 7, 1890. Serial No. 346,865. (No model.)

*To all whom it may concern:*

Be it known that I, LIONEL HEYNEMANN, a citizen of the United States, residing in the city and county of San Francisco and State of California, have invented certain new and useful Improvements in Cable Street-Railways, of which the following is a specification.

My invention relates to improvements in the means for supporting the so-called "carrier-pulleys," designed to carry the cable at regular distances all along the cable-tube. The carrier-pulleys are under the rope and placed in the lower part of the tube. Heretofore they were supported in four ways—first, by small piers built up from the bottom of the tube. This method interfered with the waterway and collected dirt near the pulley; second, by the concrete or other material forming the sides of the tube, which, besides being expensive, created difficulties in ramming the concrete; third, the frame holding the journal-boxes of the pulley was suspended from the slot-iron, the fourth and most common way being to support the pulleys on the yoke.

Its disadvantages are the noise all along the route of the cable, owing to the yoke transmitting the vibrations of the rapidly-revolving pulley, and its inaccessibility. The pulleys are oiled and attended to from trap-openings in the street, necessarily placed between yokes, and sidewise from the pulley at such a distance that their attendance, removal, and resetting is inconvenient.

The object of my invention is to avoid these difficulties, which I accomplish by a fifth means of support, illustrated in the accompanying drawings, in which—

Figure 1:
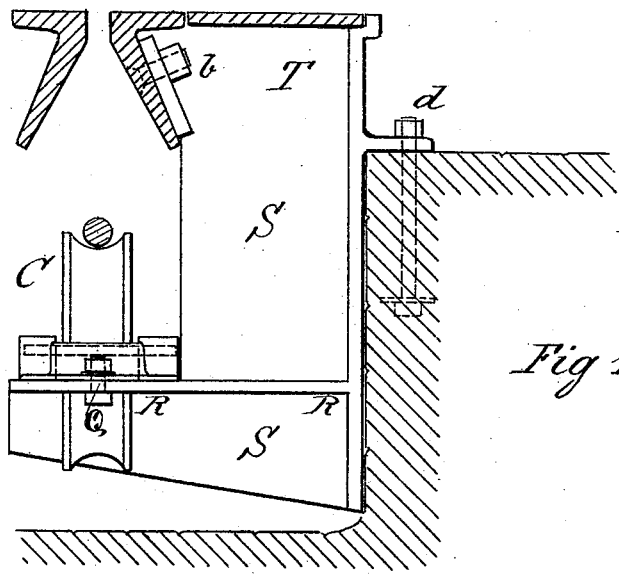
Figure 2:
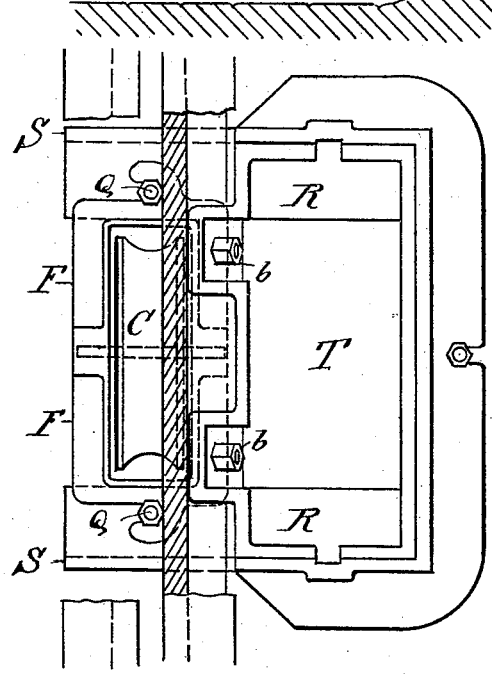

Figure 1 is a vertical cross-section of the carrier-pulley traps, Fig. 2 being a plan of the same.

Similar letters refer to similar parts in the several views.

The carrier-pulley C is secured directly to the trap T itself. The trap is here shown of cast-iron. The sides S S are carried down into the tube and project into the same, so as to afford a support to the axle-boxes of the pulley. This support can be arranged in various ways. In the method shown, the axle-boxes are set into a frame F, this frame being bolted by the bolts Q Q to a rim R R, projecting from the sides S S. By extending the rims R R across the opening on each side of the pulley the axle of the same may be supported without an extra frame. The trap T itself is bolted to the slot-iron by the bolts $b\ b$ and also to the concrete, as a general rule. The bolts $b\ b$ do not, as ordinarily, pass through the vertical side of the trap into the slot-iron—an arrangement resulting in a long bolt and consequent sinking of the trap with the overhead street traffic. Where the bolt passes through the trap the latter is made angular, to fit the angle of the slot-iron, as shown in Figs. 1 and 2. In this way the bolts $b\ b$ become short bolts, and the slot-iron itself carries a part of the weight of the trap, preventing its sinking. In this way I secure easy accessibility to the carrying-pulley. It may be made to drop into sockets or otherwise, so as to be easily removable when dirt is to be taken out of the tube through the same trap. If the pulley is to remain in place when the cable-conduit is to be cleaned, the trap must be made large enough to allow the insertion of the shovel.

Having thus described my invention, what I claim, and desire to secure by Letters Patent, is—

1. In cable railways, the combination of the street-trap T, arranged at one side only of the conduit, fastened to the continuous slot-irons upon one side, and the carrying-pulley C in the cable-conduit outside of said trap, both fastened together, substantially as described.

2. In cable street-railways, the combination of a trap T, arranged at one side only of the conduit, with its opening at the surface of the street, and the carrier-pulley C in the cable-conduit and outside of said trap, fastened together independently of the yoke or conduit, substantially as described.

3. In cable railways, the combination of a trap T, arranged at one side only of the conduit, opening at the surface of the street, with a vertical carrier-pulley outside of the same in the cable-conduit, fastened together independently of the yoke or conduit by the projecting sides S S of said trap, substantially as described.

4. In cable street-railways, the combination of the trap T, arranged at one side only of the conduit, with its cover opening at the surface of the street, the carrier-pulley C under the cable outside of said trap, and the separate pulley-frame F, attached to the sides S S of said trap, substantially as described.

5. In cable street-railways, the combination, with a street-trap T, of the slot-iron bolts b b, the trap sides S S, the pulley-frame F, with its pulley-axle journal-boxes, the bolts Q Q, and the carrier-pulley C in the cable-conduit, substantially as described, and for the purposes set forth.

LIONEL HEYNEMANN.

Witnesses:
 TIMO. LYNCH,
 JOHN C. WHITE.